United States Patent Office 2,803,148
Patented Aug. 20, 1957

2,803,148

CRANK MECHANISM WITH A STROKE THAT CAN BE ADJUSTED DURING OPERATION

Willem Hendrik Braskamp, Voorburg, Netherlands

Application July 13, 1954, Serial No. 443,041

Claims priority, application Netherlands July 17, 1953

3 Claims. (Cl. 74—600)

The invention relates to a crank mechanism for causing a reciprocating motion of a fan unit about an axis transverse to the fan shaft. It is an object of the invention to make the stroke of the crank mechanism variable, i. e. adjustable in order that the magnitude of the reciprocating motion can be adjusted at choice.

Mechanisms of this type are known in which the crank pin is fitted in a member rotating with a crank disc, said member being radially displaceable in relation to the crank disc in order to adjust the eccentricity of the crank pin.

The invention concerns a mechanism of a similar kind, and consists in that the said member is permanently loaded in a sense to cause its displacement, and in that a flexible power transmission means passes axially through the crank shaft, said means normally loading the said member in a sense to take up and, upon operation, to overcome the first-mentioned permanent load.

More particularly, according to the invention, the power transmission means may consist, at least in part, of a series of balls with means for exerting axial pressure thereon and accommodated in a passage which, starting from a bore in the crank shaft, proceeds in a curve and subsequently radially through the crank disc, an abutment projecting into said passage forming part of the member carrying the crank pin, said abutment resting against the end of the series of balls.

For exerting the adjusting force, according to an embodiment of the invention there may be screwed into the bore of the crank shaft a small rod resting against the series of balls or other flexible pressure member, said rod being coupled for rotation, while permitting relative axial motion, with a control member stationary in the axial direction.

The invention thus provides a crankstroke adjusting mechanism of a very simple and compact construction, which, except for a seizing member of the control member, can be accommodated entirely within the case, while the small number of components it comprises can be made in a simple and inexpensive manner without any special expedients.

The invention will be elucidated more fully below with reference to the embodiment shown in the drawing.

Figure 1:
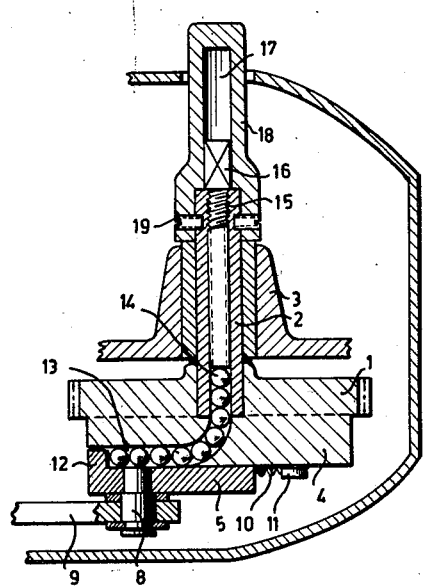
Figure 1 is a longitudinal cross-section of the mechanism, adjusted to the maximum crank stroke.
Figure 2:
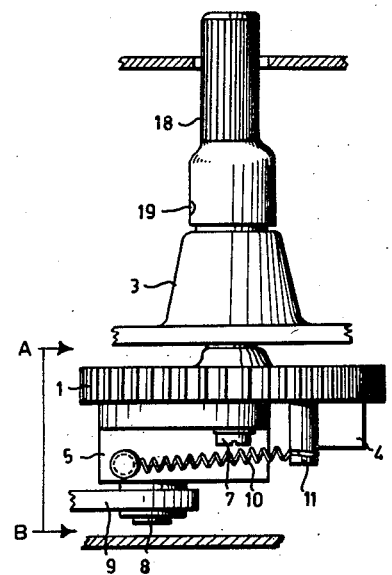
Figure 2 is a side elevation.
Figure 3:
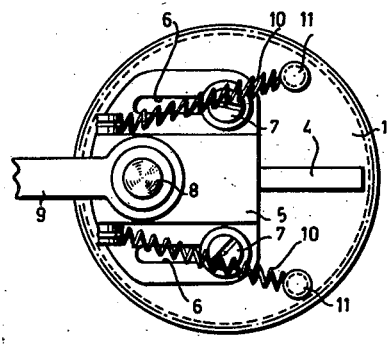
Figure 3 is a view against the underside.
Figure 4:
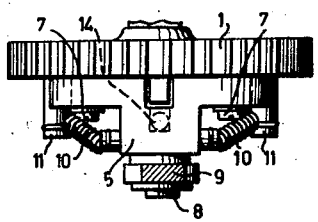
Figure 4 is a side elevation of a detail of the crank disc, seen in the direction of the arrows A—B in Figure 2.

In these figures, 1 is the crank disc, which is secured to a crank shaft 2 with a central threaded bore, said shaft being adapted to rotate in a fixed frame part 3. The drive in this case takes place via a rim gear on the crank disc, but may naturally also engage the shaft 2 directly.

Against the lower surface of the crank disc, proceeding diametrically, is formed a ridge 4 as a guide for a U-shaped slide 5, which is slidably suspended on the crank disc by means of slots 6 formed in flanges of the slide and fixed bolts 7.

In this slide is fixed the crank pin 8 for operating the connecting rod 9 of the crank mechanism, while two drawsprings 10 engage the slide, said springs being attached at the other end at 11 to the crank disc and load the slide in the sense of an inward displacement thereof across the ridge 4, i. e. in the sense of a reduction of the eccentricity of the crank pin. The extreme position in this direction is that in which the crank pin 8 is in the heart of the crank disc for a crank stroke zero.

The slide 5 further has an abutment 12, projecting into a passage 13, which is formed in the ridge 4 and passes in a curve into an axial bore of the crank disc, connected with the bore of the crank shaft.

This passage is filled with a series of balls 14 extending into the bore of the crank shaft. This series rests at one end against the abutment 12 of the slide and at the other end against the lower end of a small rod 15, which is screwed into the hollow crank shaft. This rod has a slightly thicker upper end 16 with a square cross-section, which is adapted to slide with a fit in a correspondingly formed passage 17 of a milled knob 18, which fits with a chamber about the upper end of the crank shaft and rests on the fixed frame part 3, said knob only being coupled with the crank shaft in the axial direction by means of adjusting screws 19 projecting into a circular groove of the shaft 2. The upper end of the knob projects through an opening in the case.

In the position of the drawing the springs 10 are stretched, so that they load the slide in the sense of a movement of the crank pin towards the heart of the crank disc, i. e. a reduction of the eccentricity of the crank pin. This movement is prevented by the screwed coupling of the rod 15 with the crank shaft 2. It is, however, obvious that it is possible, by an effective relative rotation, e. g. by holding the knob 18, which slowly rotates together with the crank shaft, to screw the rod 15 upwards in the shaft 2, thus permitting any desired amount of inward displacement of the crank pin by the springs 10. This produces therefore a continuous adjustment of the crank stroke with automatic fixation in every position of adjustment, simply by releasing the knob.

Rotation of the knob in the opposite direction, e. g. running ahead of its rotation with the crank shaft, results in an opposite axial displacement of the rod 15, i. e. a pressure on the abutment 12 of the slide, in consequence of which the springs 10 are overcome, and an adjustment of the crank pin in the sense of an increase of the crank stroke is obtained. This adjustment also is naturally fixed automatically in every point.

It stands to reason that instead of the series of balls some other flexible power transmission means e. g. a piece of wire, might also be used. Separate balls, however, give lower internal resistance to bending.

What I claim is:

1. A control device for the reciprocation of a fan unit driven by a source of power comprising a fixed support, a hollow shaft supported by said fixed support and defining an axial passage, a disc coupled to said hollow shaft for rotation therewith, a pin, a connecting rod coupled to said pin, and control means for coupling said pin to said disc so that said pin is radially adjustable with respect to said disc, said control means comprising a guide positioned on a surface of said disc, a member slidably positioned on said guide and supporting said pin, said guide defining a passage coupled to the axial passage in said hollow shaft, said member extending into said passage, mechanical means extending through said passages, springs coupling said member to said disc and urging said member in a predetermined radial direction with respect to the disc, and a control mounted on said hollow shaft and in said axial passage for controllably forcing said mechanical means against said member in opposition to said springs whereby the position of said pin with respect to said disc is controlled.

2. A control device as claimed in claim 1 wherein said control comprises a rod engaged by threads in said axial passage and contacting said mechanical means, a head of square cross-section affixed to said rod and a knob rotatably mounted on said hollow shaft, said knob defining a square-shaped recess for receiving the head, the controllable rotation of said knob controlling the depth of penetration of said rod into said axial passage.

3. A control device as claimed in claim 1 wherein said mechanical means comprises a series of balls interposed between said rod and said member.

References Cited in the file of this patent
UNITED STATES PATENTS

| | | |
|---|---|---|
| 606,081 | Piers | June 21, 1898 |
| 637,297 | Strong | Nov. 21, 1899 |
| 819,118 | Baines | May 1, 1906 |
| 1,629,647 | Anderson | May 24, 1927 |
| 2,569,900 | Nevin et al. | Oct. 2, 1951 |
| 2,571,189 | Bersche | Oct. 16, 1951 |